(12) United States Patent
Fu

(10) Patent No.: US 6,320,621 B1
(45) Date of Patent: Nov. 20, 2001

(54) METHOD OF SELECTING A DIGITAL CLOSED CAPTIONING SERVICE

(75) Inventor: Mark Fu, Irvine, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/277,800

(22) Filed: Mar. 27, 1999

(51) Int. Cl.[7] .................................................... H04N 7/00
(52) U.S. Cl. ............................................ 348/465; 348/468
(58) Field of Search .................................. 348/468, 465, 348/563, 569, 564; 345/327, 328; 725/51, 52

(56) References Cited

U.S. PATENT DOCUMENTS

| | | | |
|---|---|---|---|
| 5,519,443 | | 5/1996 | Salomon et al. |
| 5,818,935 | * | 10/1998 | Maa ........................................ 380/20 |
| 5,900,908 | * | 5/1999 | Kirkland ................................ 348/62 |
| 5,914,719 | * | 6/1999 | Herz ..................................... 345/418 |
| 5,959,687 | * | 9/1999 | Dinwiddie et al. ................... 348/564 |
| 5,995,159 | * | 11/1999 | Bae et al. ............................. 348/563 |
| 6,008,802 | * | 12/1999 | Iki et al. .............................. 345/327 |
| 6,108,584 | * | 8/2000 | Edwards ................................. 700/94 |

* cited by examiner

Primary Examiner—Victor R. Kostak
(74) Attorney, Agent, or Firm—Marger Johnson & McCollom, PC

(57) ABSTRACT

A method for providing selection from among closed caption services. An input is received that initiates a closed caption control. The presence of the closed caption services is then detected. The closed caption control is then activated to allow the viewer to select from all available closed caption services. In addition to the closed captioning services, auxiliary information for each service is also displayed, allowing the viewer to select the desired closed caption service.

7 Claims, 2 Drawing Sheets

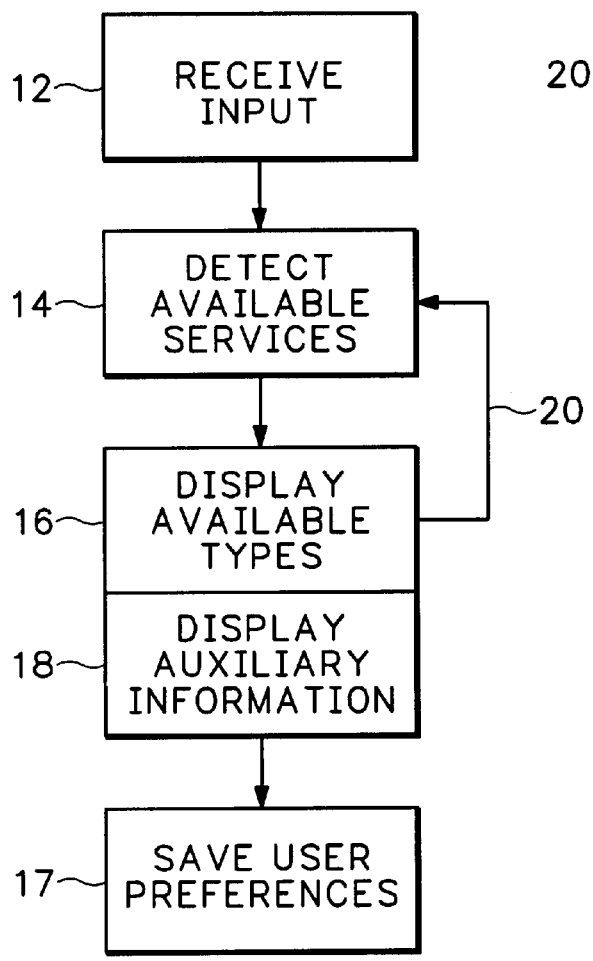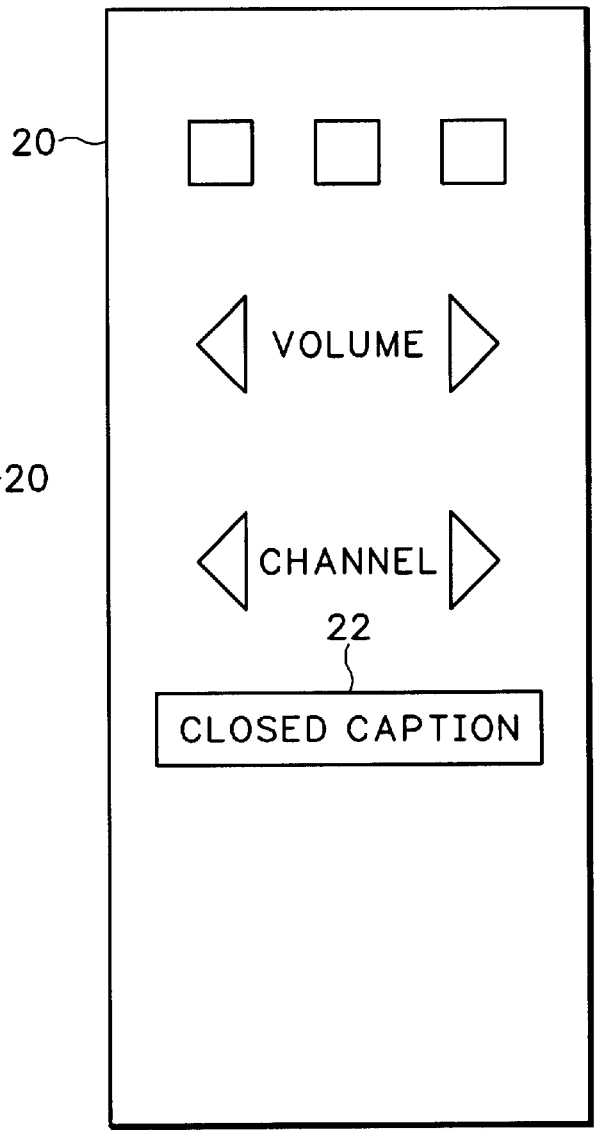

METHOD OF SELECTING A DIGITAL CLOSED CAPTIONING SERVICE

BACKGROUND OF THE INVENTION

1. Field of the Invention

This invention relates to closed captioned television broadcasts, more particularly to methods for providing selection of such services for digital television broadcasts.

2. Background of the Invention

Closed captioning is a service provided with most television broadcasts. In the current analog television standards, such as NTSC, the closed caption service is typically embedded in the vertical blanking interval of the video signal. The Electronic Industry Association (EIA) has standards for governing the provision of such services. In current NTSC televisions, the parameters of closed caption services are set out in EIA-608.

This closed caption service has several options for closed caption and text services, CC1, CC2, CC3, CC4, T1, T2, T3, T4 and EDS (electronic data service). The user can select the particular one of these services in several ways. In one method, the user can access the closed caption services menu by pressing the MENU button on the remote control. The user then makes the choice by highlighting a selection on the menu provided and then exiting the menu systems Other implementations include cycling through choices on the menu, or a list of caption services provided when a CAPTION button is pressed on the remote control. However, all of these implementations are for analog television only and does not contemplate other possibilities that are made possible by the provision of closed caption services in digital television. For example, the standard for digital closed caption services has sixteen possible closed caption services. It would be awkward for the user to have to cycle through all these selections if there are no services for them.

Therefore, it would be useful if a solution for closed caption service selection were provided for digital television broadcasts.

SUMMARY OF THE INVENTION

One aspect of the invention is a process for providing viewers with the capability to select closed caption services. The closed caption services are provided in conjunction with a digital television broadcast. The viewer sends an input to the television or other audiovisual appliance that indicates the start of a closed caption control. The appliance then monitors the incoming data stream to identify how many closed caption services are present and any auxiliary information associated with each one. The appliance then displays the service and its auxiliary information to the viewer. The viewer then selects the desired service.

The input could be from a menu or a dedicated button on a remote control, for example. The display of options to the viewer could display all the possible services, or cycle through them one at a time. As a further embodiment, the appliance could save a particular closed caption service selected with a given viewer.

BRIEF DESCRIPTION OF THE DRAWINGS

For a more complete understanding of the present invention and for further advantages thereof, reference is now made to the following Detailed Description taken in conjunction with the accompanying Drawings in which:

FIG. 1 shows a flowchart of one method of providing selections for closed caption services in accordance with the invention.

FIG. 2 shows one embodiment of a remote control offering a closed caption selection.

DETAILED DESCRIPTION OF THE PREFERRED EMBODIMENTS

Figure 3:
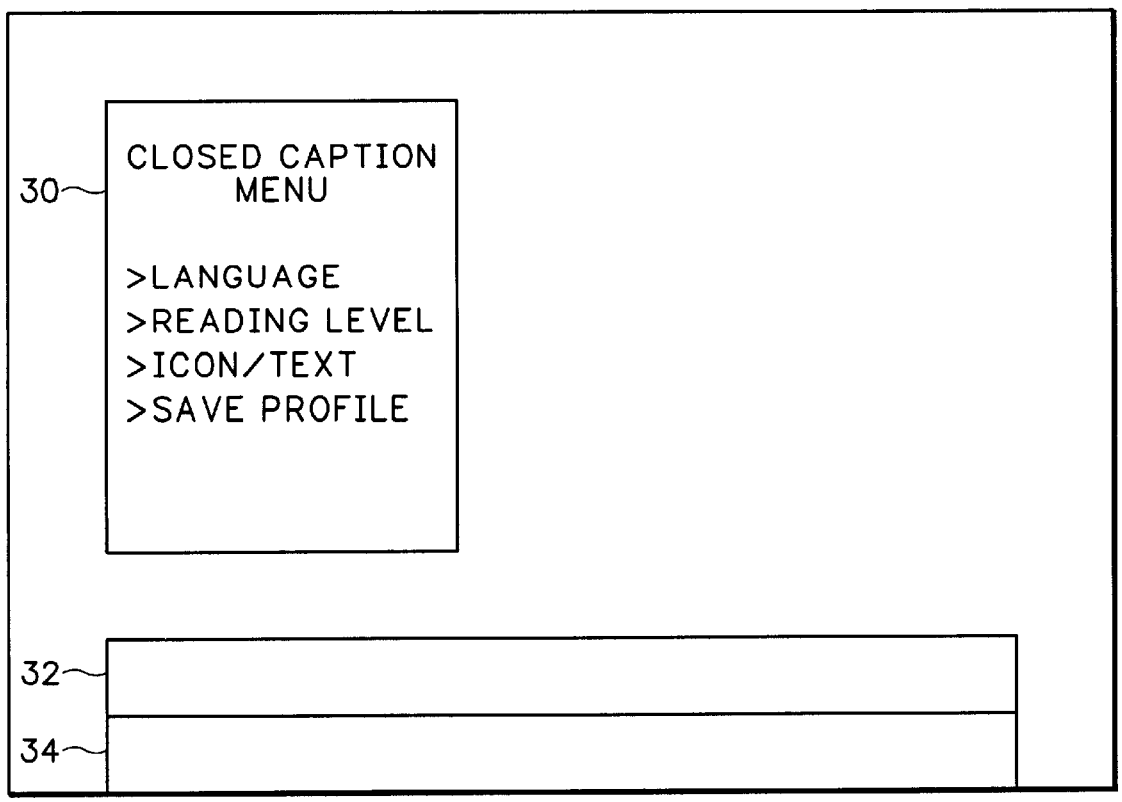
FIG. 3 shows one embodiment of a menu demonstrating examples of user selections.

With the move towards digital television broadcasts, other services such as closed captioning have to be provided for. One method for providing for selection of one of several closed caption services is shown in FIG. 1.

In step 12, an input is received at a television or other audiovisual appliance that displays digital television broadcasts. The input initiates the closed caption control, which will provide the viewer with options for closed caption services. The input could be one of several forms. For example, the appliance may come with a remote control that has a dedicated closed captioning or CC button as shown by remote control 20 with closed caption button 22. When the user presses this button, the appliance receives the input. Other options include a menu specifically for closed captioning, which could be accessed by the CC button or from the main menu of the appliance.

The appliance then detects available closed caption services. The Electronics Industry Association standard EIA-708(A), which governs closed captioning in digital television broadcasts, makes provisions for sixteen different types of closed caption services. However, all sixteen may not be available. Therefore, the appliance will determine which services are present at step 14 and then use the list of available services for display. As indicated by the arrow 20, the list could be completely populated and then displayed, or each option could be displayed as the appliance detects if there is another service until all service options have been displayed.

The display to the viewer occurs at step 16. The main part of the display will contain the closed caption service option. Any associated auxiliary information will be displayed as well, allowing the viewer to make a completely informed choice. An example of some possible auxiliary selections as shown in menu 30 in FIG. 3. For example, the auxiliary information may indicate that the particular closed caption service is designed for beginning readers, or that the text is available in English or Spanish, or that the closed caption service can be displayed as text or as an icon. While these are shown as separate steps, 16 and 18, they probably occur simultaneously.

One capability made more accessible by digital television is the use of windows. Windows on audiovisual appliances are typically used in applications such as picture-in-picture, where one channel is displayed as main channel and a small window is opened to display a secondary channel. One aspect of this invention allows the viewers to have different closed caption services for each window. One option may be displayed in window 32 and another in window 34 in FIG. 3.

Other possibilities include saving user preferences for closed captioning. This is shown in optional step 17 in FIG. 1. For example, in a multi-viewer situation, some viewers may prefer to have a particular type of closed caption service, while other may prefer other levels. This invention allows the selected closed caption service to be associated with a particular viewer name or number and then reactivated when that viewer enters the appropriate viewer identifier.

In current implementations of the EIA-708(A) standard, service #1 is the primary language of the audio portion of the program. Service #2 contains translations of the closed captioned text. The presence of service #2 is determined by a flag that is set and sent in the accompanying data stream. The flag for the reading level is set and sent in a similar fashion. The user preference could then associate the settings of these flags for each viewer and then search the incoming data stream for the appropriate service that has the correct combination of flags set in the correct states.

Thus, although there has been described to this point a particular embodiment for a method and structure for a digital television closed caption selection process, it is not intended that such specific references be considered as limitations upon the scope of this invention except in-so-far as set forth in the following claims.

What is claimed is:

1. A method for providing selection of digital television closed caption services, comprising the steps of:
    a) receiving a digital television input including digital closed captioning services, wherein the input initiates a closed caption control;
    b) detecting available closed caption services provided in the digital television input;
    c) activating the closed caption control, wherein the closed caption control allows a viewer to review only the available digital closed caption services, wherein all of the available digital closed caption services are contained in the digital television input; and
    d) providing auxiliary information about each of the available closed caption services.

2. The method as claimed in claim 1, wherein said input further comprises pressing a dedicated button on a remote control.

3. The method as claimed in claim 1, wherein said input further comprises a selection from a menu presented to said user.

4. The method as claimed in claim 1, wherein said auxiliary information further comprises a language in which said closed caption services is presented.

5. The method as claimed in claim 1, wherein said auxiliary information further comprises a reading level to which said closed caption service is directed.

6. The method as claimed in claim 1, wherein said auxiliary information further comprises a selection between text and icon.

7. The method as claimed in claim 1, said method further comprising the step of saving a selected closed caption service with a viewer identifier.

* * * * *